April 25, 1933.  G. F. WEINREICH  1,905,667
TRAIN CONTROL TRACKWAY EQUIPMENT
Filed March 2, 1931  8 Sheets-Sheet 1

Inventor
George F. Weinreich
Wm Walter Owen.
Atty.

Fig. 2

April 25, 1933.   G. F. WEINREICH   1,905,667
TRAIN CONTROL TRACKWAY EQUIPMENT
Filed March 2, 1931   8 Sheets-Sheet 4

Inventor
George F. Weinreich
Wm Walter Owen.
Atty.

April 25, 1933.    G. F. WEINREICH    1,905,667
TRAIN CONTROL TRACKWAY EQUIPMENT
Filed March 2, 1931    8 Sheets-Sheet 5

Fig. 5

Inventor
George F. Weinreich
Atty.

Patented Apr. 25, 1933

1,905,667

UNITED STATES PATENT OFFICE

GEORGE F. WEINREICH, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

TRAIN-CONTROL TRACKWAY EQUIPMENT

Application filed March 2, 1931. Serial No. 519,421.

The present invention relates in general to railway traffic-controlling apparatus, and particularly to train-control trackway equipment and the manner of interconnecting it with an automatic permissive block-signalling system, commonly known as an A. P. B. system.

The accompanying drawings, comprising Fig. 1A and Figs. 1 to 9, inclusive, diagrammatically illustrate sufficient circuits and apparatus to enable the invention to be readily understood.

Figures 1, 1A:
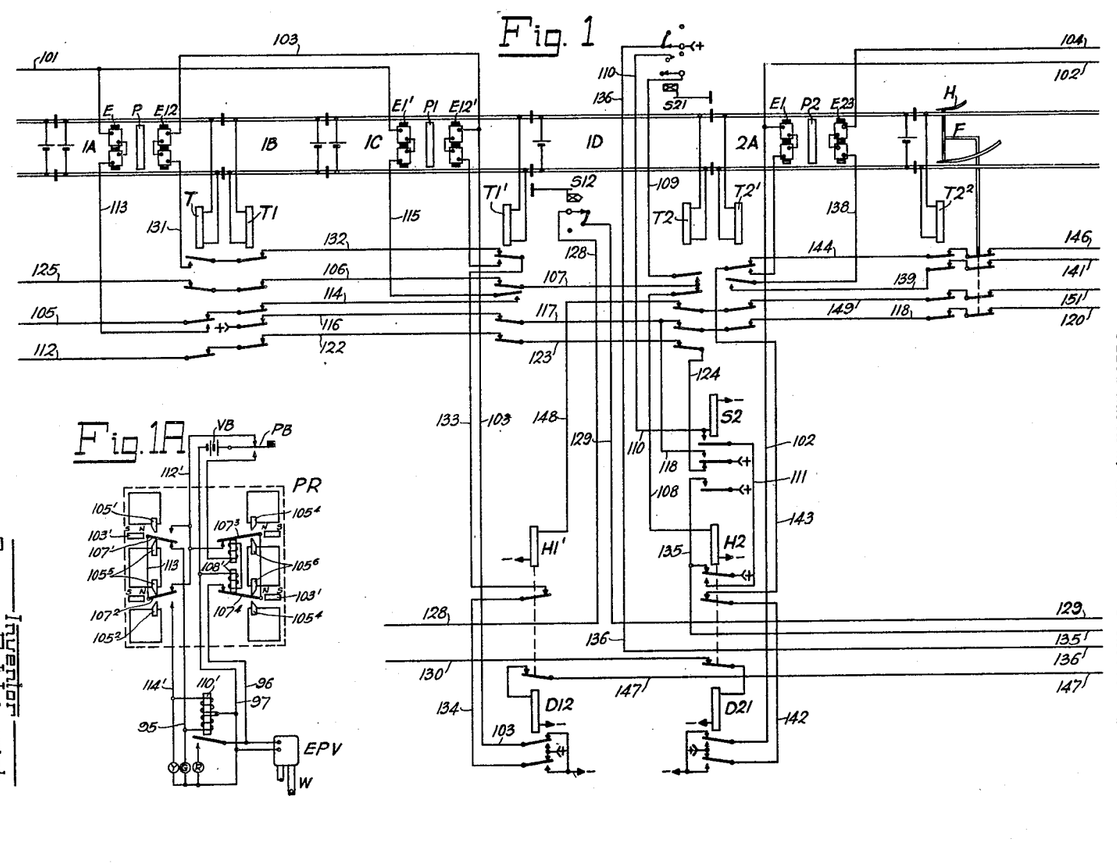
Figure 2:
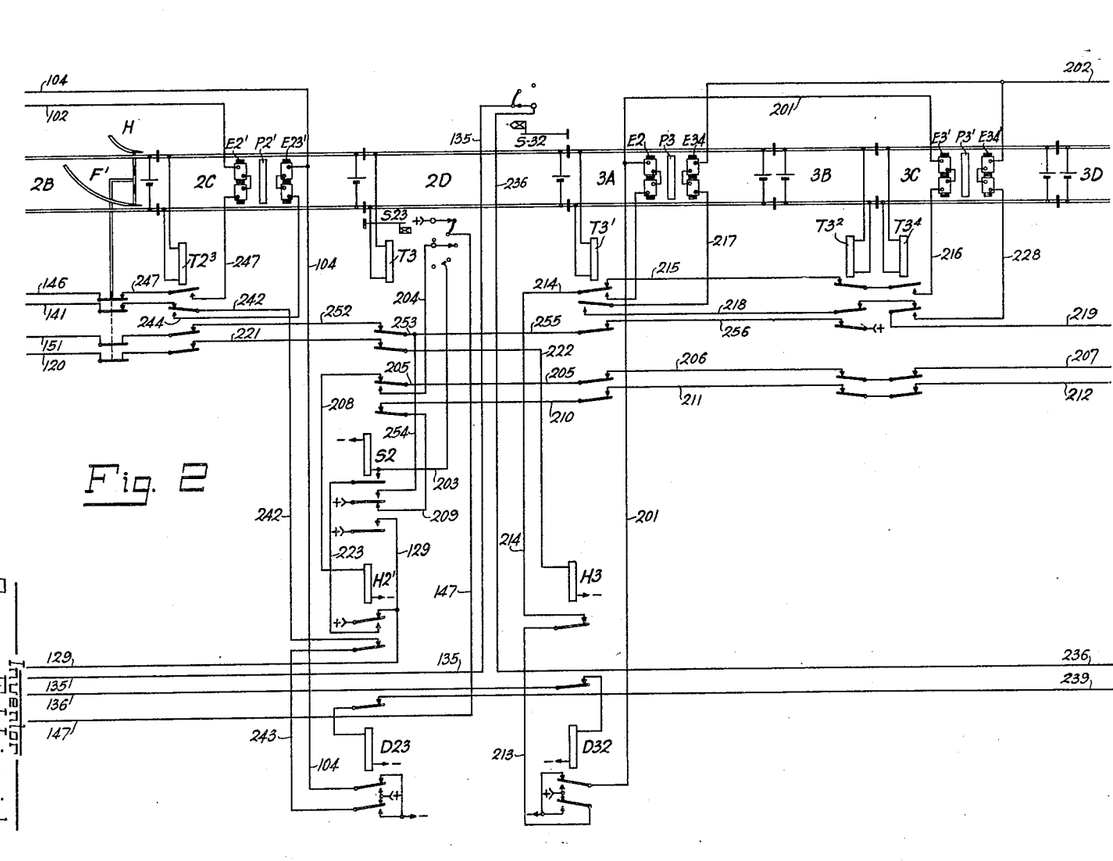

Fig. 1A shows vehicle equipment of a train-control system such as disclosed in the copending Hudd application, Serial No. 377,418, filed July 11, 1929. This equipment comprises a magnetic pick-up relay PR suspended from the locomotive tender in such a position that, as the tender passes over the trackway, the relay will pass through the magnetic fields of permanent and electro-trackway magnets, known as inductors. The pick-up relay comprises armatures $107'$ to $107^4$ which are adapted to be actuated by magnetism picked up from the trackway permanent and electromagnet by the magnetic flux collector plates associated with their pole pieces $105^1$—$105^6$, respectively. The armatures $107^1$ to $107^4$ are held into association with either of their respective pole pieces by magnetism of north polarity induced in their free ends by the small permanent magnets $103'$. It may be mentioned, however, that these magnets are very weak compared with those placed along the trackway, and, therefore, the trackway magnets readily overcome the pull normally exerted on the armatures by the magnets $103'$. Associated with armatures $107^3$ and $107^4$ are armature-restoring coils 108 which, when energized, are effective to move the armatures $107^3$ or $107^4$ into association with their pole pieces $105^6$ if they are not already in association with these pole pieces.

An electro-pneumatic valve EPV and an associated whistle W are provided to give a warning and to initiate an automatic brake application in any desired manner, upon de-energization of the electro-pneumatic valve. Three lamp signals G, Y, and R, under the control of the pick-up relay PR and of an auxiliary relay $110'$, serve to visually indicate the traffic conditions "proceed", "caution", and "stop", respectively.

The vehicle equipment is shown at "clear". With the relay $110'$, electro-pneumatic valve EPV, and "proceed" indicating lamp G all energized. The circuit of EPV extends from the positive terminal of the vehicle battery VB, through the brake contacts of push-button PB, conductor $112'$, the contacts and armatures $107^4$ and $107^3$, respectively, conductor 96, EPV, and conductor 97 to the negative terminal of the battery.

The circuit for the relay $110'$ and lamp G extends from positive battery on conductor $112'$, through contact and armature $107^2$, conductor $113'$, armature $107^1$, and its lower contact to conductor 95, where the circuit divides; one branch extending through the lower winding of relay $110'$, to conductor 97 and the negative terminal of the battery; while the other branch extends through the "proceed" lamp G to the conductor 97 and the negative terminal of battery.

Figs. 1 to 5, inclusive, when placed with the corresponding lines thereof in alignment, show a stretch of track divided by means of insulated joints into a plurality of successive track sections each designated A to D, respectively, with a suitable prefix designating the block to which they belong. Each track section is provided with a track relay connected across the rails adjacent one end of the section and designated by the reference character T with a suitable exponent. A suitable source of current is shown extended across rails at the other end of each section. The semaphore type of wayside signals are illustrated. For each semaphore signal there is provided a set of three relays comprising a control relay H, a clear relay D, and a stick relay S, with suitable exponents designating their location in the stretch of track.

The control circuit for the signalling machines used in moving the semaphores are not shown since they have no bearing on the present invention. It may be mentioned, however, that when a set of relays H and D are energized, their controlled signal is set at "clear"; when a "clear" relay D is deenergized, the semaphore is at "caution"; and when both the H and D relays are deenergized, the semaphore is at "stop".

At each point in the trackway at which it is desired to transmit train-control influences, a set of trackway magnets comprising a permanent magnet P and two electromagnets E, with suitable exponents, which may be of the type employed in the previously-mentioned co-pending application, are used. The electromagnets are placed under control of the H and D relays in a manner to enable them to control the signalling equipment on a passing vehicle to agree with the signals displayed by the wayside equipment. The permanent magnet of each set always serves to initiate a brake application each time a set of trackway magnets is passed irrespective of traffic conditions; while the subsequently passed electromagnet of a set serves to cancel or modify the effect produced by the permanent magnet depending upon whether the semaphore in advance of the location is at clear or caution.

The entire stretch of track is shown as being unoccupied, all track relays and all H and D relays are shown as being energized, and accordingly all wayside signals are at "clear". The control relay H1' is energized over a circuit extending from positive potential supplied through contacts of track relay T3², conductor 256, contacts of track relay T3', conductor 255, contacts of track relay T3, conductor 252, through contacts of track relay T2³ and of switch F', respectively, conductor 151, through contacts of switch F, contacts of track relay T2², conductor 149, through contacts of track relay T2' and T2, respectively, conductor 148, and the winding of H1' to negative potential. This relay closes one point in the common portion of the energizing circuits of trackway electromagnets E12 and E12', respectively, and also closes a point in the operating circuit of its associated clear relay D12.

The relay D12 is energized over a circuit extending from positive potential supplied through the contacts of semaphore S23, closed in the "clear" and "caution" positions of the semaphore, conductor 147, contacts of H1', and the winding of D12 to negative potential. The relay D12, when energized, reverses the direction of current flow to conductors 103 and 134.

With the relays H1' and D12 energized, if an east bound train enters section 1A, thereby causing the track relay T to become deenergized, a circuit will be completed from positive potential through the lower make contact of D12, conductor 134, through the upper contacts of H1', conductor 133, through the upper contacts of T1', conductor 132, through contacts of track relays T1 and T, respectively, conductor 131, through the lower and upper windings of trackway electromagnet E12, conductor 103, and through the upper make contact of D12 to negative potential.

Current flow through the electromagnets, such as E12, with their D relay energized, is in the proper direction to cause the outside pole pieces of the electromagnet to be of north polarity, while the center pole piece will be of south polarity. Obviously, if the traced circuit is completed with the associated relay D12 deenergized, the outside pole pieces of the magnet E12 will be of south polarity and the center pole piece of north polarity.

As the pick-up relay PR passes over the permanent magnet trackway element P, armatures $107^1$ and $107^3$ or armatures $107^2$ and $107^4$ are operated, depending upon the polarity of the permanent trackway element. The operation of either pair brings about the same circuit changes, and it will, therefore, be assumed that the armatures $107^1$ and $107^3$ are the ones operated. The armature $107^3$, in operating, interrupts the traced circuit through the electro-pneumatic valve EPV, thereby causing the electro-pneumatic valve to become deenergized and initiate a brake application, and at the same time causing the whistle W to sound a warning to the engineman. The armature $107^1$ interrupts the multiple circuit passing through the lower winding of relay 110' and "proceed" indicating lamp G. Accordingly, the lamp G is extinguished, and the relay 110' becomes deenergized. The "stop" indicating lamp R does not light up, however, as its circuit is now open at the armature $107^3$. An instant later, before sufficient time has expired to cause an automatic brake application to occur, the trackway magnet E12 is encountered by the pick-up relay, and since the outside pole pieces of E12 are of north polarity, this magnet will be effective to restore armatures $107^1$ and $107^3$, because, as stated, the trackway magnet E12 produces magnetism of north polarity in the pole pieces $105^1$ to $105^4$ and induces magnetism of south polarity in pole pieces $105^5$ and $105^6$, respectively. Consequently, the armatures $107^1$ and $107^3$ are restored and the circuits for the "proceed" signal G, relay 110', and the electro-pneumatic valve EPV are re-established, and no brake application occurs; since the equipment, under the control of the electro-pneumatic valve, is assumed to be arranged to delay the brake application for at least six seconds after its deenergization, for example as is done in the disclosure of a co-pending Kelly application, Ser. No. 292,966, filed July 16, 1928.

The entry of a train into section A1, it will be noted, effects other circuit changes in the A. P. B. system. For example, track relay T opens the circuit of the stop relay H2. This relay in turn effects the deenergization of caution relay D21 and the movement of semaphore S21 to its stop position. The relay H2 also brakes the connection between conductors 142 and 143 included in the common energizing circuit of trackway magnets E1 and E2' so that a west bound train will receive a stopping influence before entering the section in which the siding is included and will again receive such influence as it is about to enter section 1D. The semaphore S21 in moving to its stop position removes positive potential from conductor 136 extending to the caution relay D32, accordingly this latter relay becomes deenergized to reverse the connection to trackway magnet E and to cause the semaphore S32 to move to its caution position.

It will now be assumed that the train passes over the trackway magnets P and E12 at a time that the signal S12 is at "caution," under which condition the clear relay D12 will be deenergized and, consequently, the direction of current flow through E12 reversed. When the train passes over the trackway magnet P, the pick-up relay functions in the same manner as it did under clear traffic conditions, but when passing over E12, instead of restoring armatures $107^1$ and $107^3$, operates the armatures $107^2$ and $107^4$, owing to the magnetism of south polarity which it induces in the pole pieces $105^2$ and $105^4$. This action is further assisted by the magnetism of north polarity which it induces in pole pieces $105^5$ and $105^6$. Armature $107^4$, in operating, merely breaks a second point in the traced circuit for the electro-pneumatic valve EPV, while the armature $107^2$, in addition to breaking a second point in the traced circuit for the "proceed" indicating signal G and lower winding of relay 110', establishes a circuit for the "caution" signal Y and upper winding of relay 110'. This circuit extends from the positive terminal of the vehicle battery VB, the break contact springs of the push-button PB, conductor 112', the upper contact and armature $107^1$, conductor 113', the armature $107^2$ and its lower contact, conductor 114' and the upper winding of relay 110' and the "caution" lamp Y in multiple to the negative terminal of the battery VB. Accordingly, the relay 110' again becomes energized to maintain the circuit of the "stop" signal R broken, and the "caution" signal Y becomes lighted to inform the engineman that the wayside signal being approached is at "caution" and that acknowledgment must be made within the six-second time allowed to avoid an automatic brake application occurring. The engineman, accordingly, momentarily operates the push-button PB to energize armature-restoring magnets 108' to re-establish the circuit of the electro-pneumatic valve.

If the train passes through section 1A at a time when the signal S12 is at "stop", the trackway magnet E12 will be deenergized as the pick-up relay on the vehicle passes over it, owing to the deenergized condition of control relay H1'. As previously mentioned, the interrelated control between H, D, and S is of the usual character, S standing at "danger" when the associated H is deenergized and at "caution" when the associated D alone is deenergized. Therefore, when the pick-up relay PR passes over the permanent magnet P, armature $107^3$ will be operated as before to again initiate a brake application. The armature $107^2$ will also be restored to its initial position, thereby interrupting the traced circuit through the upper winding of relay 110' and the "caution" signal Y, or "clear" signal C, in case the last signal received was "clear". The engineman, accordingly, acknowledges, as before, to re-establish the circuit of the electro-pneumatic valve, but since the armature $107^2$ is now in engagement with its upper contacts, relay 110' remains deenergized and a circuit is completed for the "stop" signal R in the cab. This circuit extends from positive terminal of the vehicle battery VB, through the break contact of push-button PB, conductor 112', contact and armature $107^3$, contact and armature $107^4$, conductor 96, the armature and resting contact of relay 110', through the lamp R to the negative terminal of the battery VB. It will be obvious, therefore, that a vehicle which proceeds into a block which is occupied or which, for any reason, has its associated signal at "stop", will have the "stop" indication repeated back into the vehicle cab. The trackway electromagnets of all other sections are controlled in like manner by their associated H and D relays.

As soon as the train enters section 1B, track relay T1 becomes deenergized and at its upper contacts opens the circuit of E12. Obviously, therefore, it will be seen that E12, when energized, is energized only from the time the train enters the section 1A until it enters section 1B. When the train enters section 1C, the track relay T1' becomes deenergized and switches the conductor 133 from connection with E12 to the electromagnet E12' so that this latter trackway magnet will be effective as the vehicle passes through section 1C in the same manner as was E12 as the vehicle passed through section 1A.

It will now be assumed that there is an eastbound train on siding H and that the main line is unoccupied in both directions. It will further be assumed that the switch F1 of the siding H is shifted to closed position preparatory to the train proceeding eastward. The closure of switch F causes its associated contacts to open. The opening of the contacts used in connecting conductors 146 and 247 is without effect at this time because of the energized condition of track relay T2³; the opening of the contacts connecting conductors 141 and 242 is without effect owing to the energized condition of track relay T2′; while the opening of the contacts extending between conductors 151, 252, and between conductors 120 and 221 interrupt the energizing circuits of control relays H1′ and H3, respectively. The circuit of relay H3 extended from positive potential supplied through contacts of track relay T1, conductor 116, contacts of track relay T1′, conductor 117, contacts of track relays T2 and T2′, respectively, conductor 118, contacts of track relay T2², contacts of the switch F, conductor 120, contacts of switch F′, contacts of track relays T2³ and T3, respectively, conductor 222, and the winding of control relay H3 to negative potential.

The relays H1′ and H3, upon becoming deenergized, at their lower contacts open the circuits of their associated "clear" relays D12 and D32, respectively, and, as previously explained, their associated semaphore signals S12 and S32 are accordingly moved from their "clear" to "stop" positions.

Figure 5:
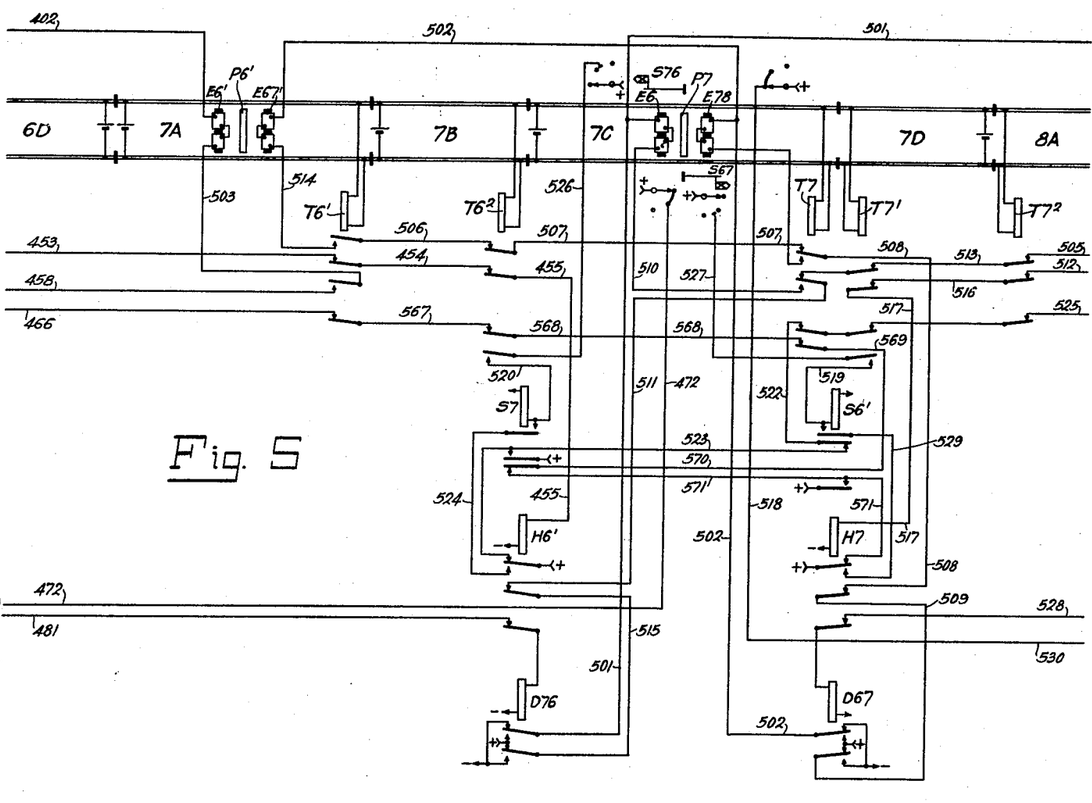

Temporarily assuming that the trackway equipment in Fig. 5 extends to left of that shown in Fig. 1, it will be seen that the movement of semaphore S12 to "stop" position interrupts a circuit passing through the clear relay D67, conductor 528 and through conductors 128 and 129 to positive potential supplied from contacts on control relay H2′. The relay D67 accordingly becomes deenergized, and, in known manner, closes the circuit for moving its semaphore S67 from its "clear" to its "caution" position. Likewise, the movement of the semaphore S32 to its "stop" position interrupts the circuit for "clear" relay D43 which extends from positive potential supplied through contacts of the control relay H2, conductor 135, through the contacts of signal S32, conductor 236, and through contacts of control relay H3′. The "clear" relay D43, upon becoming deenergized, in known manner causes its associated signal S43 to also move to its "caution" position.

Summarizing the effect on the signalling system, of the movement of the switch H and its associated F′ contacts, it will be observed that the semaphores S67 and S12 have changed from "clear", to "caution" and "stop", respectively; while the semaphores S43 and S32 have also changed from "clear" to "caution" and "stop", respectively, thereby warning the enginemen of any train approaching from either direction, that the main line ahead is not clear.

With the various circuits and apparatus modified as a result of the opening of contacts of the switch F′, if an eastbound train enters section 7A, still assuming that Fig. 5 is at the left of Fig. 1, the track relay T6′, upon becoming deenergized, completes a circuit for the trackway magnet E67′. This circuit extends from positive potential, now supplied through back contacts of relay D67 and conductor 502, through E67′, conductor 514, contacts of track relay T6′, conductor 506, contacts of track relay T6², conductor 507, contacts of track relay T7, conductor 508, contacts of control relay H7, conductor 509, and contacts of D67 to negative potential. The electromagnet trackway element E67′ is, therefore, energized by current flow in the proper direction to make its outside pole piece of south polarity, and its center pole piece of north polarity. Accordingly, the effect produced in the vehicle by the permanent magnet P6′ is merely modified by the electromagnet E67′, so as to produce a caution indication in the cab, which, as explained, requires the acknowledgement by the engineman. In a similar manner, E78 modifies the effect produced by P7, requiring the engineman to again acknowledge.

If the train proceeds into section 1A, the electromagnet E12 will be in a deenergized condition when the pick-up relay of the vehicle passes thereover owing to the deenergized condition of control relay H1′ and, therefore, the changed condition brought about by the magnet P will remain in force and will require acknowledgement by the engineer to avoid a brake application. Upon acknowledgement the "stop" cab signal will be displayed. It will also be observed that the circuit of track magnet E12′ will also be open at the upper contacts of control relay H1′ and consequently, acknowledgement by the engineer will be again required to prevent a brake application.

Should the train proceed until its pick-up relay passes over the trackway magnet P2, acknowledgement will have to again be made to avoid a brake application, because the electromagnet E23 has had its circuit opened by the contacts of the switch F′.

The relay H3, upon becoming deenergized, at its upper contacts opens the battery-feed circuit for trackway magnets E2 and E3′, accordingly the effect produced on the vehicle equipment of a westbound train by the permanent magnets P3′ and P3 cannot be modified or neutralized by their electromagnets E3′ and E2. However, a westbound train upon passing over magnets E4 and E3 will have the effect produced by their associated permanent magnets modified in the same manner as described in connection with an eastbound train passing over magnets E12 and E12'.

It will now be assumed that the main line is unoccupied and that the train on siding H enters the main line. When this occurs, the track relay T2² becomes deenergized. This track relay opens other points in the same circuits opened by operation of switch F'.

As soon as the train enters section 2C, the track relay T2³ becomes deenergized and closes a point in the circuit of magnet E2', over conductors 146 and 247; opens other points in the circuits opened by the switch F', and completes a circuit for the trackway electromagnet E23'. This circuit extends from positive potential, supplied through contacts of the clear relay D23 over conductor 243, contacts of H2', conductor 242, contacts of track relay T2³, through the windings of E23' conductor 104, and to negative potential supplied through the contacts of D23. The direction of current flow through the trackway device E23' is such that it will be effective to restore the armatures of the vehicle pick-up relay PR, actuated by the permanent magnet P2', thereby permitting the train to proceed without requiring the engineer to acknowledge, in agreement with the clear signal displayed by semaphore S23.

When the train clears track section 2B, the track relay T2² again becomes energized, and as soon as the switch F' has been restored to open position, as illustrated, its associated contacts again become closed. The closure of the contacts of T2² and of the switch F' are without effect at this time since the circuits controlled by them are now open at the contacts of H2 and T2³.

When the train enters section 2D, track relay T3 becomes deenergized. This relay, at its two upper pairs of contacts, opens another point in certain of the circuits opened by track relay T2³, at its next-to-lower contacts opens the circuit of control relay H2' and prepares a pick-up circuit for stick relay S2, and at its lowermost contacts, opens the circuit of control relay H3'.

Before going into the description of changes occurring in the condition of the trackway equipment consequent to the deenergization of relays H2' and H3', it is believed advisable to point out generally the effect the deenergization of these relays has on the signalling system at this time. The relay H2', upon becoming deenergized, interrupts the circuit of its clear relay D23 which also becomes deenergized, and the associated semaphore S23 is, accordingly, moved to its stop position. During the movement of S23 to its stop position the pick-up circuit for the stick relay S2 is completed, from positive potential supplied through contacts of control relay H4, conductor 311, contacts of track relay T4, conductor 310, contacts of stick relay D4, conductor 309, contacts of track relay T3⁵, conductor 207, contacts of track relays T3⁴ and T3², respectively, conductor 206, contacts of track relay T3', conductor 205, contacts of track relay T3, conductor 204, the lower wiper and contact of semaphore S23, conductor 203 and the winding of S2 to negative potential. The relay S2, upon becoming energized, at its lower contacts applies positive potential to conductor 129 to take the place of that removed by H2'; at its next-to-lowest contacts opens a second point in the circuit of control relay H3'. The relay H3', upon becoming deenergized, interrupts a second point in the circuit of its "clear" relay D43, also consequent to the deenergization of H3'; the associated semaphore S43 is moved from its caution to its stop position in the usual manner. The relay H3', also, at its upper contacts, interrupts the circuit of control relay H5, which accordingly becomes deenergized, opening the circuit of its associated "clear" relay D54 and that of control relay H5'. The relay H5', upon becoming deenergized, opens the circuit of its "clear" relay D65 and the circuit of control relay H6', Fig. 5, now assumed to represent a section of trackway to the right of Fig. 4. The relay H6', upon becoming deenergized, opens the circuit of its associated clear relay D76 and the circuit of control relay H2 of Fig. 1, now employed as the next track section to the right of Fig. 5. The control relay H2, upon becoming deenergized, opens the circuit of its "clear" relay D21. Accordingly, the semaphores S21, S76, S65, S54, and S32 extending between two passing points are moved to their "stop" positions. The signals to the east of the siding which moved from clear to caution and stop, respectively, remain in these positions until the train clears section 2D. Obviously, therefore, if a second eastbound train passes the signal S67 at caution—again assuming Fig. 5 as being at the left of Fig. 1—the influence transmitted to the vehicle by a permanent magnet P7 will be modified by the electromagnet E78 in accordance with the caution condition of S67, since this circuit will be completed through the back contacts of "clear" relay D67, instead of through its front contacts. On the other hand, if such train proceeds into section 1A, the control relay H1' being deenergized, the electromagnet E12 will also be deenergized and the effect of the permanent magnet P will, therefore, not be modified by E12.

As previously explained when any control relay is deenergized, no circuit can be completed for the electromagnet trackway element controlled by it. Consequently, the "stop" indication produced at each of the respective signal locations between the sidings, will be repeated to any westbound vehicle without modification by their associated electromagnets.

The wayside signalling and train-control trackway equipment governing westbound traffic is identical to that used when traffic is eastbound. It is, therefore, believed to be unnecessary to describe the operations which occur when a westbound train passes over the track rails.

Figure 3:
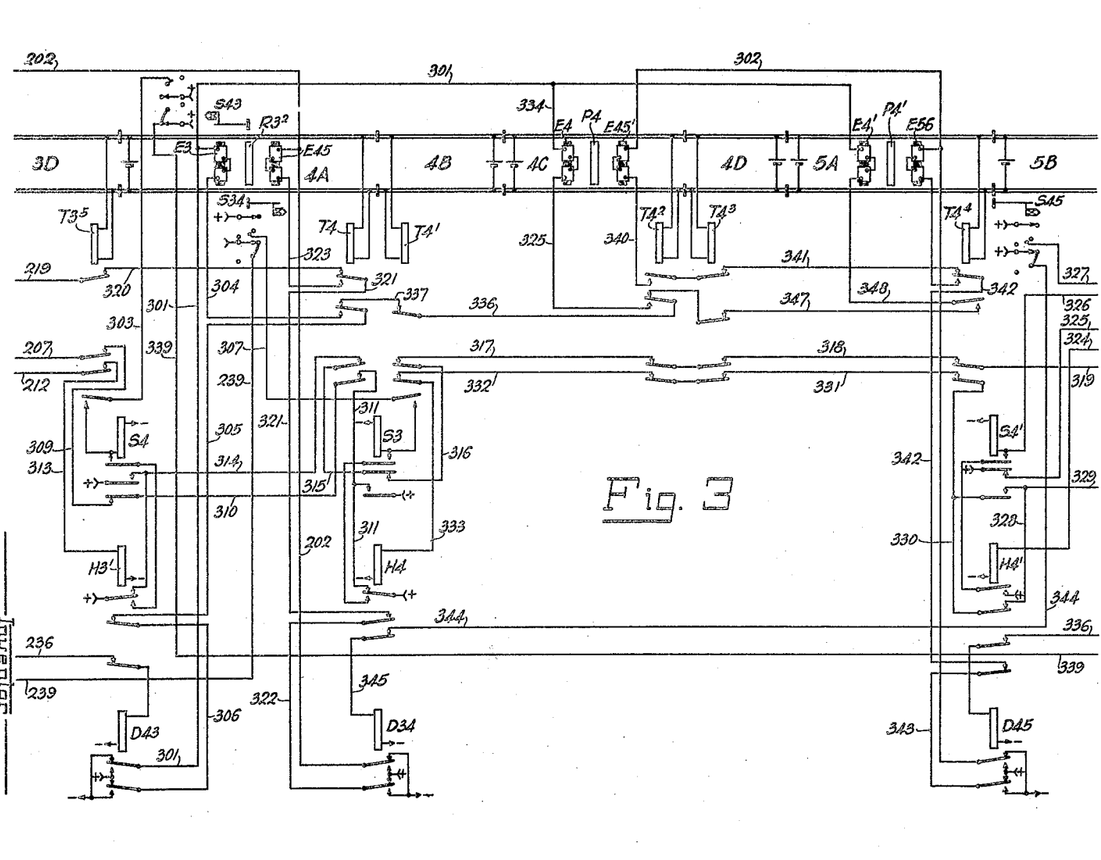
Figure 4:
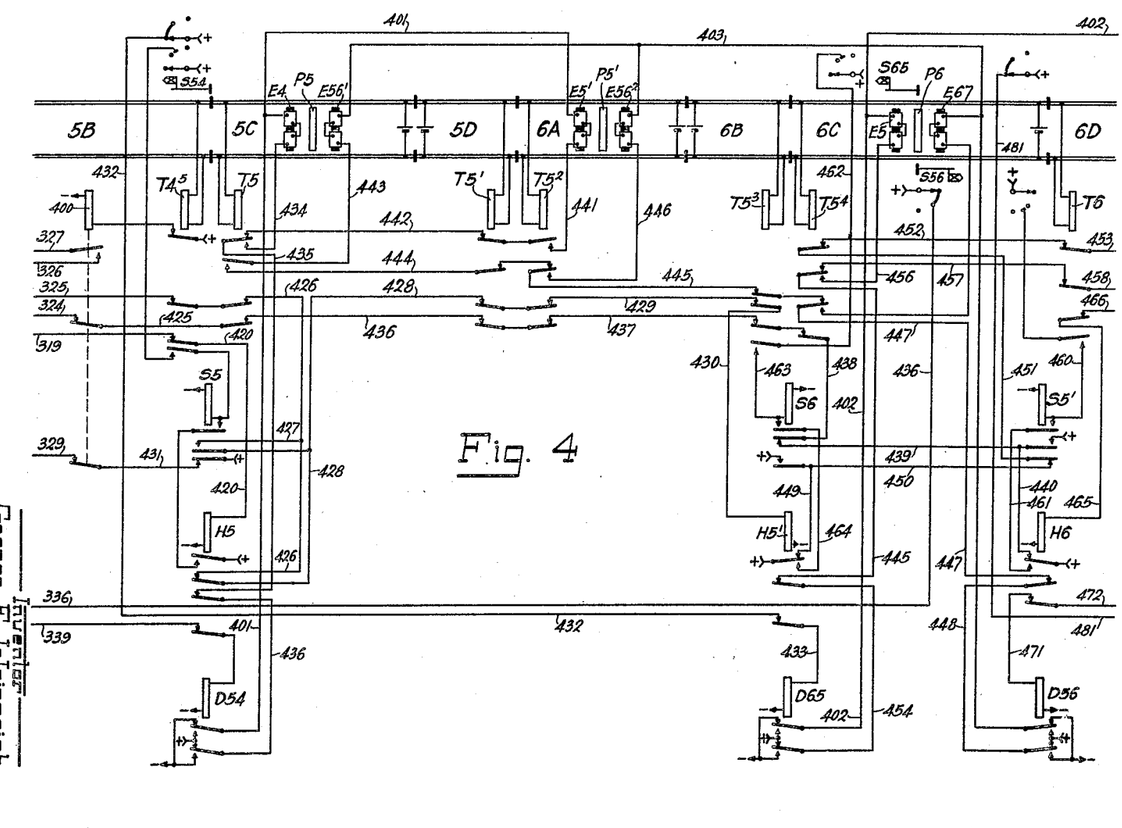
Figure 6:
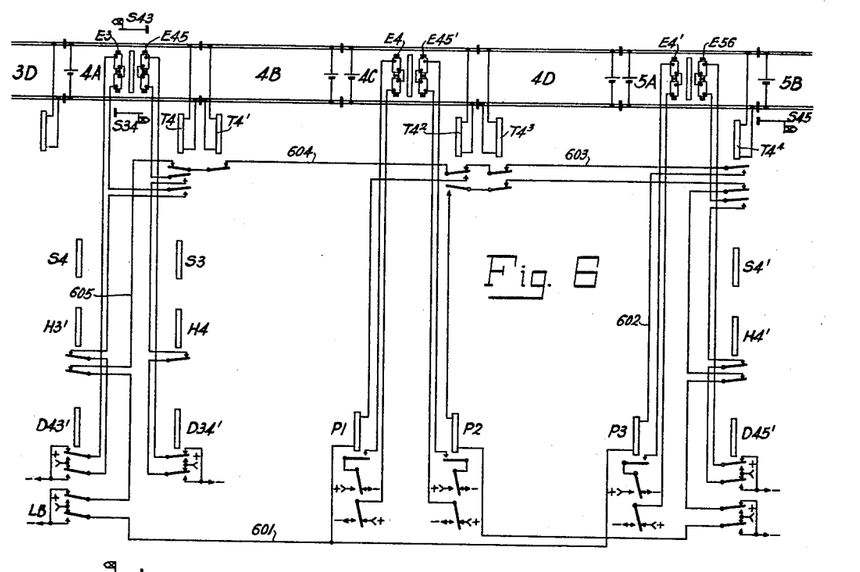

In Fig. 6 the train-control circuits are shown with a locally located battery for each set of inductors and is shown applied to sections 3D to 5B, illustrated in Fig. 3. In Fig. 6, however, the signalling circuits have been omitted, they being the same as those shown in Fig. 3.

This scheme uses two line wires and a polar relay at each advance location. With this arrangement, the electromagnet trackway elements at the signal location are controlled directly by the clear relays D43' and D45' in the same manner as in the former arrangement. The electromagnets E4, E45', and E4' are, however, controlled by their respective polar relays P1, P2, and P3. These polar relays are operated by line battery fed to them through contacts of the clear relays D43' and D45', the current being fed in a direction depending on the energized or deenergized condition of the clear relays.

In order to further bring out the manner of operation of the modified form of the invention, it will now be assumed that the vehicle enters section 5B at a time that signal S43 is at clear. Under these circumstances, the relay D43' is energized, as shown, and the track relay T4⁴ upon dropping its armature, at its upper contacts completes the circuit of polar relay P3. This circuit extends from positive potential through the make contacts of relay D43', conductor 601, the winding of P3, conductor 602, through contacts of track relay T4⁴, conductor 603, the upper contacts of track relay T4³ and T4², respectively, conductor 604, contacts of track relay T4' and T4, respectively, conductor 605, the lower contacts of control H3', to negative potential through the make contact springs on relay D43'. The polar relay P3, accordingly, operates in the proper direction to energize electromagnet E4' in the proper direction to transmit a clear indication to the vehicle equipment. Obviously, the electromagnet element E4 will control the vehicle equipment in like manner as a result of the energization of polar relay P1 when the track relay T4² drops its armature, upon the vehicle approaching track section 4B.

On the other hand, if upon entering either of these sections the relay D43' should be deenergized, the polar relay will be energized in the reverse direction to feed current to the trackway electromagnet in the reverse direction, and this will result in the transmission of the caution indication to the vehicle equipment in the manner hereinbefore described.

Figure 7:
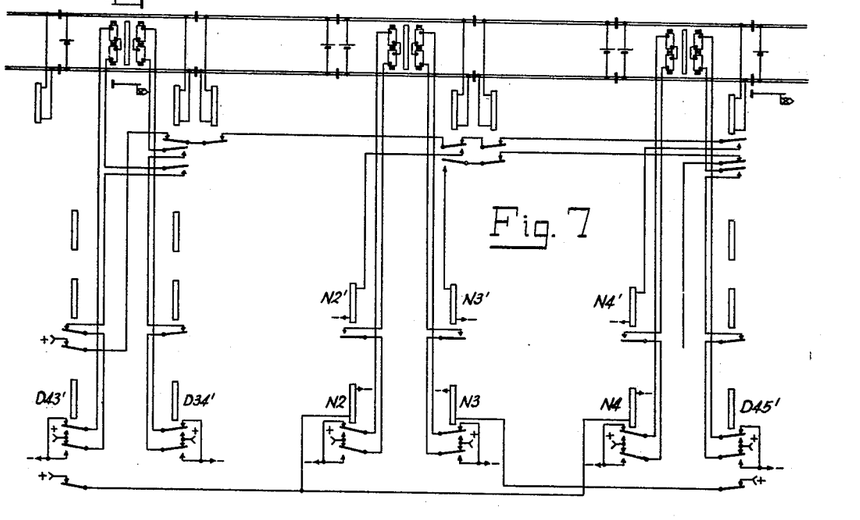

In Fig. 7 a further modification of the train control circuit shown in Figs. 1 to 5, is illustrated employing a local battery for each set of inductors. This scheme uses two line wires and the signal common. The inductors at the signal are controlled in the same manner as before. However, instead of employing a polar relay, as is done in the circuit shown in Fig. 6, neutral relays are employed. These neutral relays are directly controlled by the clear relays D43' and D45'. As illustrated, the relay D43' when energized completes the circuit of its associated two neutral relays N2 and N4, while the neutral relay N3 is under control of the clear relay D45'. The neutral relays N2', N3', and N4', function in the same manner as the neutral contacts do in the circuit of Fig. 6 to actually complete the circuit of the electromagnet trackway elements as a vehicle passes over the tracks.

Figure 8:
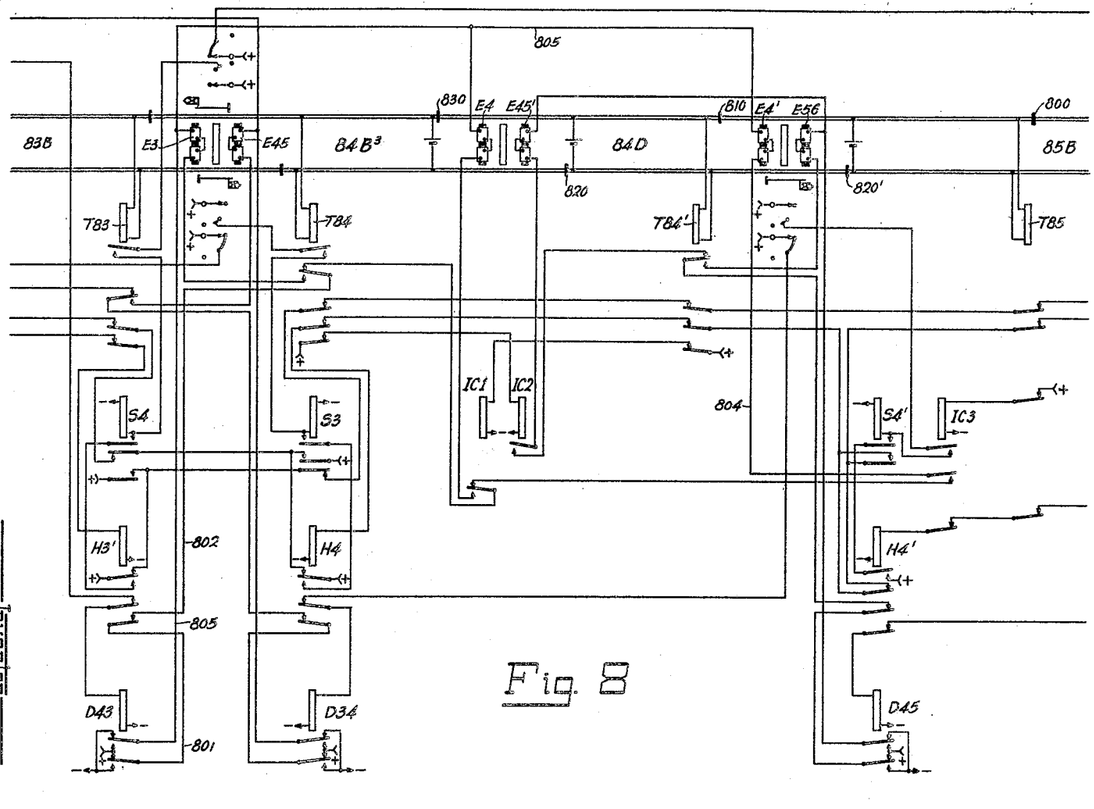
Figure 9:
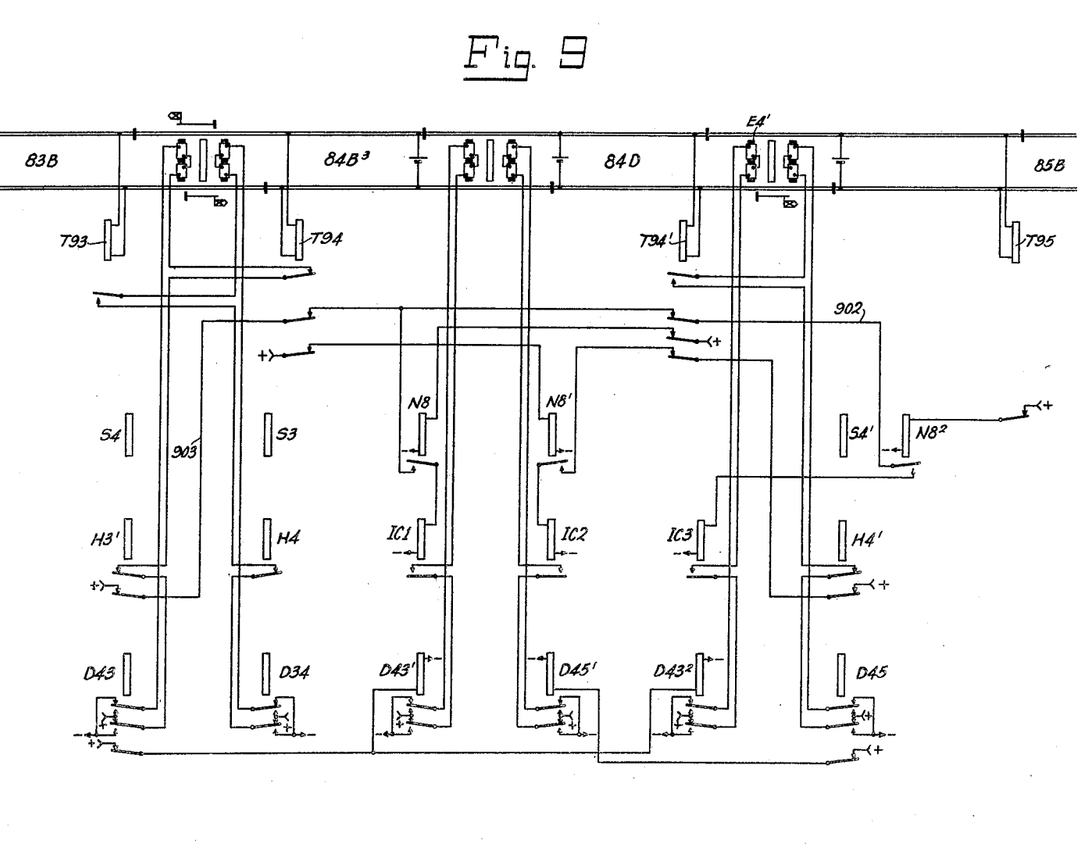

In the hereinbefore-described circuit arrangements, an isolated cut track section is necessary at each point along the trackway at which train control elements are located. In Figs. 8 and 9 the train-control circuits have been so modified that only half the number of cut sections are required as in the former arrangement, and these, in most instances will be the ones already provided for control of the signalling circuits. There is, therefore, an appreciable saving in materials and installation costs over those hereinbefore described.

With this arrangement of track circuits, however, the receiver is preferably located immediately ahead of the front wheels of the locomotive, and if the locomotive is one which is to be at times operated tender first, a second receiver must be provided to the rear of the rear wheels of the tender. With two receivers, a switching device would be provided for at will, changing from control of one to the other.

The circuit arrangements of Fig. 8 are arranged for storage-battery operation and the stretch of trackway shown corresponds to that shown in Figs. 3, 6, and 7. With this circuit arrangement, a westbound train advancing into section 85B past the insulation 800 causes the track relay T85 to drop its armature. When this occurs, the circuits of the control relay H4, inductor-control relay IC3, and control relay H4' are opened and these relays, accordingly, become deenergized. The inductor-control relay IC3 at its upper contacts prepares a pick-up circuit for the stick relay S4′ as is done by the relay 400 of Fig. 4, at its middle set of springs closes the energizing circuit of inductor E4′; and at its lowermost springs opens a second point in the operating circuit of control relay H4′. The circuit completed for inductor E4′ extends from current supplied through contacts of D43, over conductor 801, through contacts of relay H3′, conductor 802, through contacts of track relay T8⁴, conductor 803, contacts of inductor-control relay IC1 and IC3, respectively, conductor 804, the winding of E4′, conductor 805, and to the opposite side of the current supply through the contacts of clear relay D43. Obviously, the direction of current flow through E4′ is directly dependent on the condition of clear-control relay D43 as in the former circuit arrangements. As soon as the train passes beyond insulation 810 of section 84D, the track relay T84′ becomes deenergized. When this occurs, the circuit for inductor-control relay IC1 is opened, and this relay accordingly substitutes inductor E4 for inductor E4′ so that inductor E4 will later control the vehicle equipment in the same manner as did E4′.

The circuit of E4, however, is not maintained closed for a much longer period than is necessary, because, the distance between insulation 820 and 830 is less than that between the front and rear axle of the shortest vehicle used on the railroad. Therefore, as soon as the rear of the train passes beyond insulation 820, or the front wheels of the locomotive pass beyond insulation 830, the circuit is opened by the relay IC1 becoming energized as a result of the track relay T84′ again energizing when section 84D is cleared, or by the track relay T84 deenergizing in case the the train is not clear of section 84D.

The circuit of inductor E3 is controlled in the same manner as in the former arrangements. Obviously, the trackway inductors E45, E45′, and E56 will be controlled in like manner when the traffic is moving in the opposite direction. The signalling circuits themselves are like those formerly described, except, as stated, fewer track relays are employed. A further description involving the signalling circuits is, therefore, thought unnecessary.

In Fig. 9 the train-control circuits of Fig. 8 are modified for primary battery operation. In this arrangement the direction of current applied to the trackway inductors is controlled by auxiliary clear relays D43′, D43², and D45′ under control of clear relays D43 and D45 in the same manner as are the polar relays controlled by the corresponding clear relays shown in Fig. 6. The completion of the circuits to the trackway inductors are brought about by inductor-control relays such as used in the disclosure of Fig. 8, but instead of controlling these inductor-controlled relays directly from the track relays, they are controlled by auxiliary neutral relays N8, N8′, and N8², which are in turn controlled by the track relays.

With the foregoing arrangement when a westbound train has advanced into section 85B sufficiently to shunt battery from the track relay T95, this relay drops its armature and opens the circuit of neutral relay N8². This relay in dropping its armature completes the circuit of inductor-control relay IC3, which circuit extends from negative potential through IC3, the contacts of N8², conductor 902, through the contacts of track relays T94′ and T94, respectively, conductor 903 and through the make contacts of control relay H3′ to positive battery. The inductor-control relay IC3 accordingly energizes and completes the circuit of the inductor E4′ in a direction dependent upon the condition of clear relay D43 and its auxiliary relay D43².

What is claimed is:

1. In combination with a stretch of trackway having sidings for permitting the passage of trains and being divided into insulated sections, sets of trackway electromagnets in various of the sections, each set including electromagnets for transmitting impulses to vehicles passing in both directions, means for preventing the energization of any of the magnets for controlling a vehicle moving in one direction over the stretch when a vehicle is moving over the stretch in the other direction, and means for successively energizing the other magnets of the sets first in one direction and then the other.

2. In a train-control system for single track railroads provided with track circuits, the combination with a group of track elements comprising three elements adapted to communicate influences inductively through an intervening air gap to a train traveling thereby in either direction, one of said elements being active to communicate the same influence to a train traveling thereby in either direction, and variable control circuits for each of the other elements under control of the track circuits to selectively and variably energize one of said elements to neutralize or modify the influence of the first element in accordance with traffic conditions in advance.

3. In an automatic train-control system for single-track railroads equipped with an A. P. B. system having pairs of opposing signals, groups of track elements in the vicinity of said signals and braking distances from the signal locations respectively, means controlled by one element of each group for transmitting a stop initiating and signal-changing influence to a passing vehicle irrespective of its direction of movement, whether it is moving locomotive first or tender first, and independently of traffic conditions, and other trackway elements of each group selectively controlled by said signalling system to modify the effect of the first element to enable the indication of the signal, governing traffic in the direction in which the train approaches the last element of the group, to be automatically repeated on the vehicle if such signal is at clear and to cause the indication to be repeated on the vehicle, consequent to a necessary act on the part of an engineman to avoid a brake application, if such signal is at danger.

4. The combination with a stretch of track having the usual passing sidings and equipped with an A. P. B. signalling system including control, clear, and track relays, of groups of trackway elements placed centrally between the rails at various points, means controlled by relays of the signalling system for controlling the elements to the rear of a train to cause a following train to receive clear, caution, and stop indications as it approaches the first train, and means controlled by the relays of the signalling system for conditioning the elements in advance of the train for giving stop indications to any train moving in the opposite direction towards the first train as such train approaches a siding.

5. Railway traffic-controlling apparatus comprising a stretch of railway track divided into a plurality of successive track sections by pairs of staggered insulated joints, a track relay for each section, a set of train-control trackway elements placed along the trackway in each of the spaces between the joints of each pair, and means controlled by said track relays for influencing one or another of the elements of one of said sets of elements in accordance with traffic conditions, consequent to the entry of a vehicle into the space between the joints of a pair of adjacent sections.

6. Railway traffic-controlling apparatus comprising a stretch of railway track divided into a plurality of successive track sections by pairs of staggered insulated joints, a track relay for each section, a pair of train-control elements placed along the trackway in the space between the joints of each pair, and traffic-controlled means effective, consequent to the entry of a vehicle into one of such spaces from either direction, to cause one or the other of said elements to selectively transmit one of a plurality of characteristic influences to train-carried train-control equipment passing thereover, the element transmitting the influence depending upon the direction of vehicle movement.

7. Railway traffic-controlling apparatus comprising a stretch of railway track divided into a plurality of successive track sections by pairs of staggered insulated joints, a track relay for each section, a set of trackway magnets comprising an electromagnet, a permanent magnet and an electromagnet, placed along the trackway in the space between the joints of each pair, and arranged in the order named, vehicle-carried means always influenced by the permanent magnet of each set to initiate a brake application, and traffic-controlled means effective, consequent to the entry of a vehicle into one of such spaces from either direction, to cause the effect produced by a permanent magnet to be modified by one or the other of said electromagnets, depending upon the direction of vehicle travel, one way or another or not modified depending upon their location and the traffic conditions prevailing at the time they are effective.

8. Railway traffic-controlling apparatus comprising a stretch of railway track divided into a plurality of successive track sections by pairs of staggered insulated joints spaced a distance less than that between the front and rear axle of the shortest railway vehicle used on the trackway to be governed in accordance with traffic conditions, two trackway elements each so located within the space of the insulated joints that a vehicle-carried receiver, in passing over the space between the insulated joints, will pass over the second encountered electromagnet before the rear of the vehicle has been brought within the space between the insulated joints and before the vehicle has advanced beyond the second encountered insulated joint of the pair.

9. In a traffic-controlling system a stretch of trackway divided into a plurality of successive track sections by pairs of staggered insulated joints, a first trackway element in the space between said joints permanently effective to transmit a control influence to vehicle-carried means each time such vehicle-carried means passes thereover, a second element within said space encountered after the receiving means has passed the first element, and means controlled in accordance with traffic conditions for causing said second element to in certain instances modify or wholly nullify the influence produced by the first encountered element, the effect produced by the second encountered element depending on traffic conditions.

10. In combination with a stretch of track divided into insulated sections, sets of track magnets wholly within certain of said sections, each set comprising a permanent magnet placed between two electromagnets and employed to control traffic in both directions, and A. P. B. signalling controlled circuits and apparatus for selectively energizing one electromagnet of certain or all sets passed over by a vehicle, the electromagnet or electromagnets energized depending upon the existing traffic condition and upon the direction of the vehicle movement.

11. In combination with a stretch of single track railway equipped with an A. P. B. signalling system having three indication, wayside signals for governing traffic in opposite directions; the provision of a group of trackway elements of a train control system at each of two widely separated signal locations, a third group of elements placed intermediate to the first two groups at a point substantially at braking distance from such groups, and apparatus controlled by the A. P. B. system as a vehicle passes from one signal to the other for influencing the last encountered element of the first encountered group to reflect in the vehicle the signal displayed by the associated signal and for influencing the last encountered elements of the second and last encountered groups to reflect in the vehicle the condition of the second encountered of the two signals irrespective of the direction of movement of the vehicle.

12. In combination with a stretch of single track railway equipped with an A. P. B. signalling system; the provision of groups of train control magnetic trackway elements arranged at the junctions of adjacent electrically isolated track sections, together with circuits for differently influencing one or another of said trackway elements, as a vehicle passes thereover, to variably influence signal equipment carried by the vehicle to keep it in agreement with either of two of the three indications if displayed by the controlling wayside signals of the A. P. B. system as they are approached; and means controlled by an intermediate one of the train control magnetic trackway elements for insuring the display, in the vehicle, of the third possible indication of the approached wayside signal if such indication is displayed.

13. In combination with a stretch of single track equipped with an A. P. B. signalling system, groups of trackway equipment for use in transmitting influences to a passing vehicle, each including two electromagnets, there being a group at each of two signal locations of the A. P. B. system remotely disposed with respect to each other, and a third group at a location intermediate to the first two groups, local sources of energy at the respective trackway equipment locations for energizing the respective electromagnets of such equipments; circuits closed exclusively by relays of the A. P. B. system, for applying the local current source associated with the trackway magnets at the first signal location, and likewise, the local current source at the second signal location to one of the electromagnets thereat; and auxiliary relays at the intermediate location and at the second signal location controlled by the relays of the A. P. B. system to apply the local potential at the intermediate location to the electromagnets thereat and the local potential at the second signal location to its other electromagnet, the application of potential to the respective magnets being controlled in sequences determined in accordance with traffic conditions as translated by the A. P. B. system.

14. In a combination such as set forth by claim 13, characterized in that; the auxiliary relays employed comprise two polarized relays at the intermediate location and a third such relay at the second signal location.

15. In a combination such as set forth by claim 13, characterized in that; the auxiliary relays employed comprise four neutral relays at the intermediate location and two such relays at the second signal location.

In witness whereof, I hereunto subscribe my name this 26th day of February, A. D. 1931.

GEORGE F. WEINREICH.